(12) United States Patent
Klos et al.

(10) Patent No.: US 6,726,779 B2
(45) Date of Patent: Apr. 27, 2004

(54) METHOD FOR WASHING A VEHICLE

(75) Inventors: Terry James Klos, Victoria, MN (US); Scott A. Johansen, Minneapolis, MN (US); Paul J. Mattia, Prior Lake, MN (US); Michael Edward Besse, Golden Valley, MN (US); Kenneth W. Shaw, Centennial, CO (US); Thomas M. Pederson, New Richmond, WI (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 09/829,424

(22) Filed: Apr. 9, 2001

(65) Prior Publication Data

US 2002/0179125 A1 Dec. 5, 2002

(51) Int. Cl.7 .............................. B08B 3/02; B08B 3/08
(52) U.S. Cl. .............................. 134/36; 134/26; 134/42
(58) Field of Search .............................. 134/36, 42, 26

(56) References Cited

U.S. PATENT DOCUMENTS

| | | |
|---|---|---|
| 1,647,473 A | 11/1927 | Rushmore |
| 4,305,174 A | 12/1981 | Pyle et al. |
| 4,597,898 A | 7/1986 | Vander Meer |
| 4,848,384 A | 7/1989 | Christopher et al. |
| 4,976,137 A | 12/1990 | Decker et al. |
| 5,125,981 A | 6/1992 | Belanger et al. |
| 5,137,694 A | 8/1992 | Copeland et al. |
| 5,194,230 A | 3/1993 | PeKarna et al. |
| 5,423,339 A | 6/1995 | Latimer |
| 5,463,788 A | 11/1995 | Ennis |
| 5,482,212 A | 1/1996 | Kobryn et al. |
| 5,655,713 A | 8/1997 | Gibney et al. |
| 5,929,024 A | 7/1999 | Stringer et al. |

FOREIGN PATENT DOCUMENTS

WO  WO 01/03859 A1  1/2001

*Primary Examiner*—Zeinab El-Arini
(74) *Attorney, Agent, or Firm*—Merchant & Gould P.C.

(57) ABSTRACT

The present invention relates to a method for applying a detergent use solution to a washing surface of a motor vehicle, including the steps of: (a) providing a liquid detergent concentrate that includes an active ingredient level from about 0.1 wt. % to about 15 wt. %; (b) introducing the liquid detergent concentrate into a water stream to provide a detergent use solution that includes an active ingredient level from about 0.03 wt. % and 1 wt. %; and (c) applying the detergent use solution to a washing surface of a motor vehicle. In addition, the present invention also relates to a method for washing a washing surface of a vehicle, wherein the method includes: (a) providing a liquid detergent concentrate having an active ingredients level from about 0.1 wt. % to about 15 wt. %; (b) introducing the liquid detergent concentrate into a diluent stream to provide a detergent use solution; and (c) applying the detergent use solution to a washing surface of a vehicle wherein the detergent use solution has a relatively constant active ingredients level over the entire washing surface during a wash cycle.

18 Claims, 2 Drawing Sheets

METHOD FOR WASHING A VEHICLE

FIELD OF THE INVENTION

The invention relates to a method for washing a vehicle. In particular, the present invention related to a method for washing a vehicle that provides for a relatively constant detergent use solution concentration over the washing surface of the vehicle.

BACKGROUND OF THE INVENTION

Car wash facilities generally obtain liquid detergents in concentrated form and dilute the solution as desired by injecting the concentrated detergent into a pressured water line. Using such dilution techniques can cause problems in that it is hard to get the appropriate exact dilutions required for various vehicle washing applications. In fact, using a concentrated liquid detergent solution, the concentration of the active ingredients in the diluted use solution can vary considerably over a very short time period, such as within one cycle of an automated vehicle washing station sweeping over the vehicle.

Using this method, the liquid detergent concentrate that is diluted typically has an active concentration from about 20 wt. % to about 40 wt. %. After dilution, the detergent use solution typically has an active concentration of about 1 wt. %. For a single wash cycle, between about one and four gallons of detergent use solution is applied to the vehicle, which is between about two ounces to about five ounces are applied for each vehicle cycle wash.

SUMMARY OF THE INVENTION

This invention, in one aspect, relates to a method for applying a detergent use solution to a washing surface of a motor vehicle, including the steps of: (a) providing a liquid detergent concentrate that includes an active ingredient level from about 0.1 wt. % to about 15 wt. %; (b) introducing the liquid detergent concentrate into a water stream to provide a detergent use solution that includes an active ingredient level from about 0.03 wt. % and 1 wt. %; and (c) applying the detergent use solution to a washing surface of a motor vehicle.

In a further embodiment, the present invention relates to a method for washing a washing surface of a vehicle, wherein the method includes: (a) providing a liquid detergent concentrate with an active ingredients level from about 0.1 wt. % to about 15 wt. %; (b) introducing the liquid detergent concentrate into a diluent stream to provide a detergent use solution; and (c) applying the detergent use solution to a washing surface of a vehicle wherein the detergent use solution has a relatively constant active ingredients level over the entire washing surface during a wash cycle.

Moreover, the present invention relates to a method for washing a washing surface of a vehicle, the method including steps of: (a) providing a liquid detergent concentrate including an active ingredients level from about 0.1 wt. % to about 15 wt. %; (b) introducing the liquid detergent concentrate into a diluent stream using an aspirator as the injection point to provide a detergent use solution; and (c) applying the detergent use solution to a washing surface of a vehicle wherein the detergent use solution has a relatively constant active ingredients level over the entire washing surface during a wash cycle.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Figure 1:
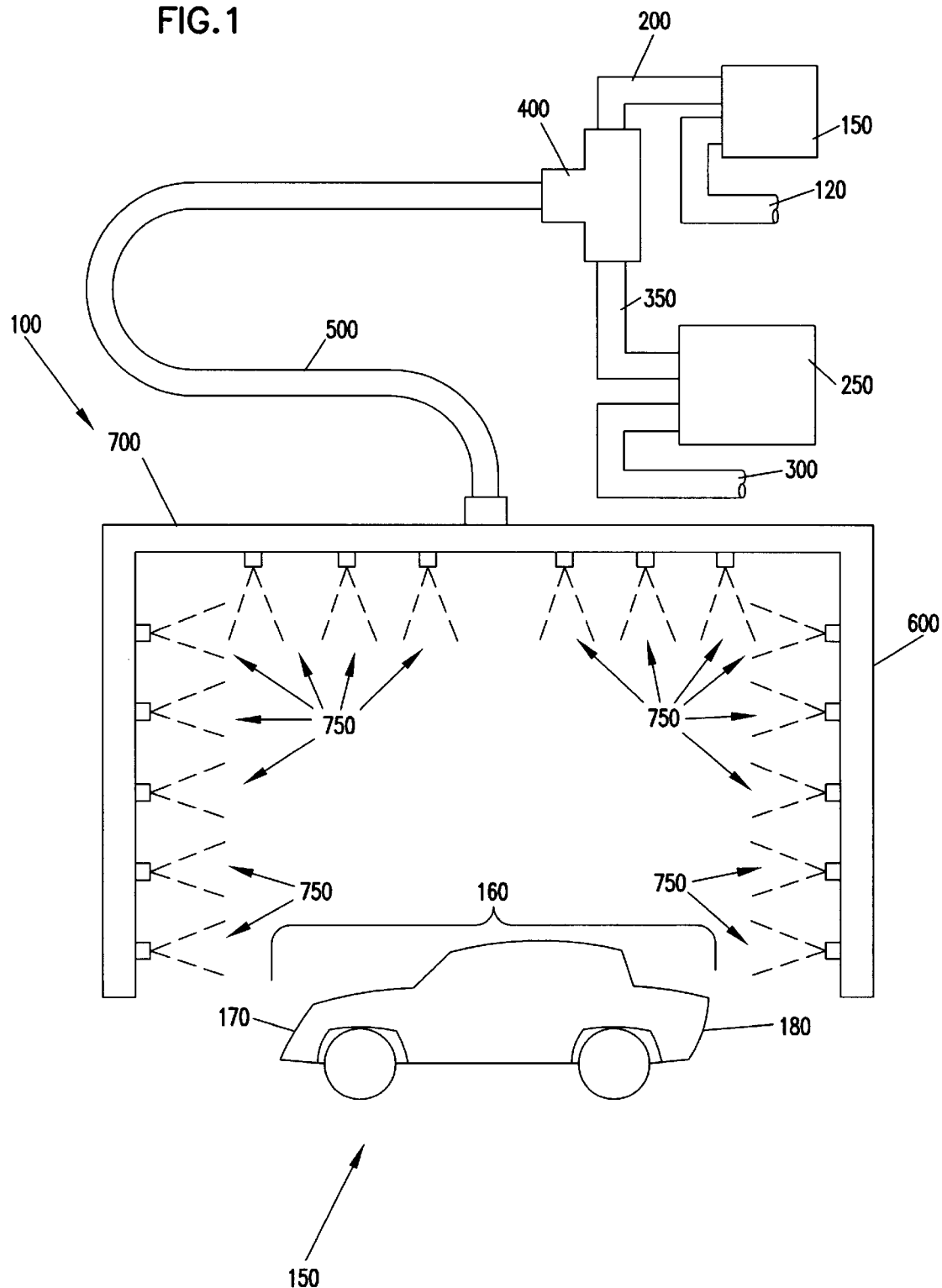
FIG. 1 is a schematic diagram of an apparatus for applying detergent use solution to a vehicle according to the principles of the invention.

The present invention may be understood more readily by reference to the drawings and the following detailed description of the invention and their previous and following description.

While the present invention will be described in combination with a particular sequence in the method, it will be understood that various configurations could be designed within the spirit and scope of this invention to accomplish the methods. Moreover, while the embodiment of the invention will be described in combination with electronic control modules for providing control signals, it will be understood that other control circuits, including mechanical, hydraulic, digital, analog, radio frequency, and optical systems, could equally well be configured within the spirit and scope of this invention. Further, the steps of the inventive methods of the present invention may be performed in any order including simultaneously, unless performance of a step requires the product of a previous step. It is also to be understood that the terminology used herein is for the purpose of describing particular embodiments only and is not intended to be limiting.

In this specification and in the claims that follow, reference will be made to a number of terms that shall be defined to have the following meanings:

Reference in the specification and concluding claims to parts by weight of a particular element or component in a composition denotes the weight relationship between the element or component and any other elements or components in the composition or article for which a part by weight is expressed.

By "active ingredient" is meant the non-water portion of the composition that is responsible for providing cleaning, drying or polishing properties. Included within the definition are particles that are degraded such that they are partially or fully dissolved or dispersed within the composition. The particles do not substantially decompose or denature in a degraded state.

"Cycle" shall mean the period whereby a vehicle wash system completes one pass of the vehicle using the same detergent use solution.

As used herein, the term "detergent" refers to those chemical compounds or mixtures commonly used to aid in the cleaning and rinsing of surfaces and fabrics. Such chemicals include detergents, softeners, bleaches, rinse aids, etc.

By "washing surface of a vehicle" is meant the portion of the vehicle between the front end and the back end that could come in contact with contaminants. The washing surface may be divided into portions, such as the front, middle and back areas of the washing surface. In general, one wash cycle is the period that it takes to one application of detergent solution to the entire washing surface of the vehicle.

Commercial vehicle washing facilities try to target the detergent use solution with a concentration of about 1 wt. percent active ingredients. However, in many commercial vehicle washing facilities, it is difficult to maintain a constant concentration of active ingredients in the detergent use solution during an entire vehicle wash cycle. It may even be difficult to maintain a constant concentration of active ingredients in a use solution simultaneously applied to multiple points on the vehicle. That is, it is believed that the active ingredient concentration of the detergent use solution varies as the use solution is applied to the motor vehicle and at various points on the vehicle. As a result, it is believed that certain portions of the motor vehicle receive a detergent use solution containing insufficient detergency to adequately clean the vehicle.

Vehicles that can be washed according to the invention include those vehicles commonly washed in commercial vehicle washing facilities including, automobiles, trucks, sport utility vehicles, and boats.

The detergent solutions of the present invention are useful for removing any type of contaminant from a vehicle surfaces including seasonal and geographical specific contaminants. Exemplary contaminants include clays, vegetable oil, mineral oil, road salt, sea salt, sand, greases, cutting fluids, drawing fluids, machine oils, antirust oils such as cosmoline, carbonaceous soils, sebaceous soils, particulate matter, waxes, paraffins, used motor oil, fuels, etc. Any vehicle surface can be cleaned including fiberglass, plastic, glass, and iron-based metals such as iron, iron alloys, e.g., steel, tin, aluminum, copper, tungsten, titanium, and molybdenum. The structure of the surface to be cleaned can vary widely and is unlimited.

Liquid detergent concentrates useful in the present invention include any liquid detergent that has an active ingredient level from about 0.01 wt. % to about 15 wt. %. Suitable liquid detergents may be made at the commercial washing facility or in an off-site location. Such liquid detergents may be manufactured using liquid or solid detergents. Such a detergent concentrate may be provided by any suitable method, including, but not limited to a device for generating a liquid detergent concentrate from a solid concentrate. A device for generating a liquid detergent concentrate from a solid concentrate is described in U.S. patent Ser. No. 09/829,429 filed Apr. 9, 2001; which patent application is incorporated herein by reference in its entirety.

Solid detergents that can be used according to the invention include those detergents that degrade when contacted with water to provide an aqueous detergent composition. An advantage to providing the detergent composition in a solid form is that it is possible to provide a high concentration of cleaning components. Suitable solid detergent forms include cast or compressed solid blocks, briquettes, powders, granular material, pellets, tablets, flakes, and gels.

Solid Detergent

The solid detergents that can be used according to the invention include those solid detergents that contain a sufficient amount of active components so that the resulting aqueous detergent can be used to clean, polish or dry the surface of vehicles. However, the solid detergent useful for generating a detergent solution of the present invention may include both active ingredients and non-active ingredients. Exemplary active components include alkaline builders, acidic builders, surfactants, corrosion inhibitors, anti-redeposition agents, chelating agents, sequestrants, dyes, and fragrances. Exemplary non-active components include water, certain solidifying agents, and certain processing aids.

Solidifying Agent

Solid detergent compositions that can be used according to the invention preferably include a sufficient amount of a component responsible for solidifying the composition ("solidifying agent") to provide a solid detergent. In general, it is desirable to use an amount of solidifying agent responsible for solidifying the composition that is sufficient to provide solidification. If too little of the solidifying agent is used, the detergent is generally not sufficiently solid and may be too soft. If too much of the solidifying agent is used, it is expected that the detergent composition may sacrifice active ingredient cleaning components at the expense of the solidifying component, and may result in a composition that is too hard and does not degrade sufficiently well when contacted with water.

One suitable type of solidifying agent includes polyethylene glycol and mixtures of different molecular weight polyethylene glycols. When polyethylene glycol or mixtures of different molecular weight polyethylene glycols are used as solidifying agents, they are preferably provided in an amount of at least about 5 wt. %, and are preferably used in an amount equal to or less than about 55 wt. %. More preferably, the amount of polyethylene glycol or mixture of polyethylene glycols provided in the solid detergent composition is from about 8 wt. % to about 30 wt. %. It should be understood that the discussion of weight percent in the context of the solid detergent refers to the weight percent of a component based upon the weight of the solid detergent.

Another suitable solidifying agent is urea. When urea is used as a solidifying agent, it is preferably provided in an amount from about 5 wt. % to about 32 wt. %, and more preferably in an amount of from about 8 wt. % to about 26 wt. %. The solid detergent may also include a hydrate-type of solidifying agent. In general, it is understood that a hydrate-type solidifying agent generally pulls water away from other components in the detergent composition thereby causing solidification. When a hydrate is used as a solidifying agent, it is preferably used in an amount from about 6 wt. % to about 60 wt. %, and more preferably in an amount from about 8 wt. % to about 50 wt. %. In addition, it should be understood that solidifying agents that can be used according to the invention may or may not be considered active components. That is, if the solidifying agent used is one that enhances the detersive nature of the detergent composition, it should be considered an active component.

Another preferred solidifying agent is one that forms a hydrate of a metal hydroxide or carbonate. The solidifying agent may provide for controlled dispensing by using solidification agents which having increased aqueous solubility. For systems which require less aqueous solubility or a slower rate of dissolution an organic nonionic or amide hardening agent may be appropriate. For a higher degree of aqueous solubility, an inorganic solidification agent or a more soluble organic agent such as urea can be used.

Furthermore, surfactants may be used to vary the hardness and solubility. Such surfactants include amides such as stearic monoethanolamide, lauric diethanolamide, and stearic diethanolamide. Nonionic surfactants have also been found to impart varying degrees of hardness and solubility.

Alkaline and Acid Builders

The solid detergent composition preferably includes a sufficient amount of alkaline builder and/or acidic builder to provide desired properties. Preferably, the builders are provided in the solid detergent composition in an amount from about 1 wt. % to about 80 wt. %, and more preferably from about 3 wt. % to about 70 wt. %.

The alkalinity builder in the composition can be any alkalinity builder known that is compatible with the other components of the composition being used. Suitable alkaline sources or mixtures thereof useful in the present invention are those capable of providing the desired pH. Alkalinity sources can comprise, for example, inorganic alkalinity sources, such as an alkali metal hydroxide, an alkali metal salt, or the like, or mixtures thereof.

Suitable alkali metal hydroxides include those generally known that are compatible with the other components of the composition being used. Some examples include sodium or potassium hydroxide, and the like. An alkali metal hydroxide may be added to the composition in a variety of forms, including for example in the form of solid beads, dissolved in an aqueous solution, or a combination thereof. Alkali metal hydroxides are commercially available as a solid in the form of prilled solids or beads having a mix of particle sizes ranging from about 12–100 U.S. mesh, or as an aqueous solution, as for example, as a 50 wt % and a 73 wt % solution.

Suitable alkali metal salts include those generally known that are compatible with the other components of the composition being used. Some examples of alkali metal salts include alkali metal carbonates, silicates, phosphonates, sulfates, borates, acetates, citrates, tartrates, succinates, edates, and the like, and mixtures thereof. Some examples include potassium and sodium carbonates and bicarbonates. The carbonate salts include, for example, potassium carbonate, potassium carbonate dihydrate, potassium carbonate trihydrate, sodium carbonate, sodium carbonate decahydrate, sodium carbonate heptahydrate, sodium carbonate monohydrate, sodium sesquicarbonate, and the double salts and mixtures thereof The bicarbonate salts include, for example, potassium bicarbonate and sodium bicarbonate and mixtures thereof. Other examples include the alkali metal ortho or complex phosphates. Examples of alkali metal orthophosphates include trisodium or tripotassium orthophosphate. The complex phosphates are especially effective because of their ability to chelate water hardness and heavy metal ions. The complex phosphates include, for example, sodium or potassium pyrophosphate, tripolyphosphate and hexametaphosphates.

Other examples of alkaline builders include ethanolamines and amines; silicates; and other like alkaline sources. Exemplary acid builders include poly(acrylic acid), butane (tricarboxylic acid), phosphonic acid, and mixtures thereof.

Surfactants

Surfactants are preferably used in the solid detergent to provide detersive properties. The solid detergent preferably includes a surfactant or a mixture of surfactants in an amount from about 1 wt. % to about 80 wt. %, and more preferably from about 5 wt. % to about 65 wt. %. Exemplary surfactants that can be used according to the invention include anionic surfactants, nonionic surfactants, amphoteric surfactants, cationic surfactants, and mixtures thereof.

Anionic surfactants are usually defined by the fact that the surface active segment of the molecule is anionic. The anionic surfactant is usually in the form of a salt, but may also be Zwitterionic or an internal salt. Examples include, but are not limited to sulfonates such as linear alkyl benzene sulfonate and alpha olefin sulfonate, sulfates such as lauryl sulfate and lauryl ether sulfate, natural soaps, and phosphate esters. Further examples include trimers, oligomers, polymers (copolymers, graft polymers, block polymers, etc.) having anionic surfactant groups thereon, such as amine groups, phosphate groups, or other polar charge centers with hydrophilic and/or hydrophobic contribution segments. The surfactant normally contains both a hydrophilic and a hydrophobic center or segment in the molecule to be able to be soluble or dispersible in water, yet display oleophilicity (e.g., dispersing and/or dissolving or attracting power) towards oils, grease, and other non-aqueous, oleophilic materials.

Further specific examples of suitable anionic surfactants are water-soluble salts of the higher alkyl sulfates, such as sodium lauryl sulfate or other suitable alkyl sulfates having 8 to 18 carbon atoms in the alkyl group, water-soluble salts of higher fatty acid monoglyceride monosulfates, such as the sodium salt of the monosulfated monoglyceride of hydrogenated coconut oil fatty acids, alkyl aryl sulfonates such as sodium dodecyl benzene sulfonate, higher alkyl sulfoacetates, higher fatty acid esters of 1,2-dihydroxy propane sulfonate, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosinate, and the sodium, potassium, and ethanolamine salts of N-lauroyl, N-myristoyl, or N-palmitoyl sarcosinate. Also effective are polycarboxylated ethylene oxide condensates of fatty alcohols.

Exemplary nonionic surfactants include nonylphenol ethoxylates, alcohol ethoxylates, ethylene oxide/propylene oxide block polymer surfactants, ethoxylated primary alkyl amines, alkoxylated thiol surfactants, polyoxyethylene-polyoxypropylene condensates, which are sold by BASF under the trade name "Pluronic", polyoxyethylene condensates of aliphatic alcohols/ethylene oxide condensates having from 1 to 30 moles of ethylene oxide per mole of coconut alcohol; ethoxylated long chain alcohols sold by Shell Chemical Co. under the trade name "Neodol", polyoxyethylene condensates of sorbitan fatty acids, alkanolamides, such as the monoalkoanolamides, dialkanolamides and the ethoxylated alkanolamides, for example coconut monoethanolamide, lauric isopropanolamide and lauric diethanolamide; and amine oxides for example dodecyldimethylamine oxide.

Zwitterionic or amphoteric surfactants useful with the invention include beta-N-alkylaminopropionic acids, n-alkyl-.beta.-iminodipropionic acids, imidazoline carboxylates, n-alky-betaines, amine oxides, sulfobetaines and sultaines.

Cationic surfactants classes include polyoxyethylene tertiary alkylamines or alkenylamines, such as ethoxylated fatty amines, quaternary ammonium surfactants and polyoxyethylene alkyletheramines. Representative specific examples of such cationic surfactants include polyoxyethylene (5) cocoamine, polyoxyethylene (15) tallowamine, distearyldimethylammonium chloride, N-dodecylpyridine chloride and polyoxypropylene (8) ethoxytrimethylammonium chloride. Many cationic quaternary ammonium surfactants of diverse structures are known in the art to be useful in the detergent solutions contemplated herein.

Corrosion Inhibitors

The solid detergent may also include corrosion inhibitors to provide corrosion resistance. Corrosion inhibitors can be provided in an amount from about 0 to about 25 wt. %, and more preferably in an amount from about 0.5 wt. % to about 20 wt. %.

Corrosion inhibitors which may be optionally added to the solid detergent include silicates, phosphate, magnesium and/ or zinc ions. Preferably, the metal ions are provided in a water soluble form. Examples of useful water soluble forms of magnesium and zinc ions are the water soluble salts thereof including the chlorides, nitrates and sulfates of the respective metals.

Anti-Redeposition, Chelating and Sequestering Agents

The solid detergent composition may additionally include anti-redeposition agents, chelating agents, and sequestrants wherein these components are provided in an amount from about 0 to about 80 wt. %, and more preferably from about 0.5 wt. % to about 65 wt. %.

Generally, anti-redeposition agents and sequestrants are those molecules capable of complexing or coordinating the metal ions commonly found in service water and thereby preventing the metal ions from interfering with the functioning of detersive components within the composition. Any number of sequestrants may be used in accordance with the invention. Representative anti-redeposition agents and sequestrants include salts of amino carboxylic acids, phosphonic acid salts, water soluble acrylic polymers, among others.

The chelating agent in the composition can be any chelating agent known that is capable of complexing with the mineral ions in the solution in the desired manner, and that is compatible with the other components of the composition. Exemplary chelating agents include amino carboxylic acid chelating agents such as N-hydroxyethyliminodiacetic acid, nitrilotriacetic acid (NTA), ethylenediaminetetraacetic acid (EDTA), N-hydroxyethylethylenediaminetriacetic acid (HEDTA), and diethylenetriaminepentaacetic acid (DTPA).

Processing Aids

The solid detergent can be prepared utilizing a processing aid. In general, a processing aid refers to a component that assists in the formation of the solid detergent. One preferred processing aid that helps in the formation of a solid detergent includes propylene glycol and hexylene glycol.

Hydrotropes are useful to maintain the organic materials, including the surfactant, readily dispersed in an aqueous cleaning solution and allow the user of the compositions to accurately provide the desired amount of the liquid detergent concentrate into the use solution. Example hydrotropes include the sodium, potassium, ammonium and alkanol ammonium salts of xylene, toluene, ethylbenzoate, isopropylbenzene, naphthalene, alkyl naphthalene sulfonates, phosphate esters of alkoxylated alkyl phenols, phosphate esters of alkoxylated alcohols and sodium, potassium and ammonium salts of the alkyl sarcosinates.

Other Ingredients

Other additives knownfor use in vehicle cleaning compositions and solutions may be employed. Such other additives may include, but are not limited to additional surfactants, hydrotropes, additional corrosion inhibitors, antimicrobials, fungicides, fragrances, dyes, antistatic agents, UV absorbers, reducing agents, buffering compounds, corrosion inhibitors, viscosity modifying (thickening or thinning) agents, and the like.

In general, it is desirable to provide the solid detergent composition with as high an active level as possible. That is, by increasing the active level of the detergent composition, it is believed that it is possible to decrease the shipping costs associated with shipping a less concentrated detergent composition. Preferably, the active level of the solid detergent composition is at least about 50 wt. %. Preferably, the active concentration of the solid detergent composition is up to about 85 wt. %, and more preferably at least about 95 wt. %. Solid detergents containing an active concentration greater than 95 percent are desirable as long as the detergent can be provided in a solid form such as a block or pellet that will degrade at a desired rate when exposed to water.

Liquid Detergent

In one embodiment, a liquid detergent concentrate is formed by degrading a solid detergent with a diluent. The liquid detergent concentrate preferably contains a concentration from about 0.1 wt. % to about 15 wt. % of solids based on the weight of the liquid detergent composition. It should be understood that the reference to a weight percent solids based on the weight of the liquid detergent composition is a reference to the amount of solids obtained from the solid detergent composition that is provided in the liquid detergent composition. The reference to "solids" in the liquid detergent composition should be understood to reflect the components derived from the solid detergent composition that may be either solid, dissolved or dispersed in the liquid detergent composition.

In one embodiment, the liquid detergent concentrate contains from about 0.1 wt. % active ingredients to about 15.0 wt. % active ingredients, preferably from about 1.1 wt. % to about 15 wt. %, more preferably from about 1.2 wt. % to about 10 wt. % active ingredients in the liquid detergent concentrate. Such active ingredients may be the same active ingredients described for the solid detergent.

Any detergent may be used to create the liquid concentrated detergent. Suitable detergents include liquid detergents and solid detergents. These detergents may contain any component suitable for the cleaning application. Typical components are known in the detergent art and include alkaline builders, sequestrants, surfactants, solubilizers and acid builders. For example, the general composition of the liquid detergent concentrate may contain an alkaline builder in a concentration from about 0 ppm to about 88,000 ppm, preferably from about 330 ppm to about 33,000 ppm, more preferably from about 400 ppm to about 20,000 ppm; a sequestrant concentration from about 0 ppm to about 88,000 ppm, preferably from about 55 ppm to about 71,500 ppm, more preferably from about 100 ppm to about 60,000 ppm; a surfactant concentration from about 110 ppm to about 88,000 ppm, preferably from about 550 ppm to about 71,500 ppm, more preferably from about 600 ppm to about 66,000 ppm; a solubilizer concentration from about 0 ppm to about 16,500 ppm, preferably from about 100 ppm to about 14,000 ppm, more preferably from about 150 ppm to about 12,500 ppm; and an acid builder from about 0 ppm to about 88,000 ppm, preferably from about 330 ppm to about 33,000 ppm, more preferably from about 400 ppm to about 30,000 ppm.

Similarly, the non-active ingredients in the liquid detergent concentrate may also be the same as the non-active ingredients described for the solid detergent. In addition, the liquid detergent concentrate includes a diluent. Suitable diluents act as a solvent for the solid detergent or liquid detergent starting materials. Exemplary diluents include aqueous diluents such as fresh water, recycled water, potable water, soft water, revers osmosis water, deionized water, and non-potable water. Generally, if water is used as the diluent, the water can be used without adjustment to the chemical composition of the water. However, if the water is excessively high in hardness, then the water may be treated with a water softener before it is mixed with the liquid detergent concentrate.

The liquid detergent concentrate is further diluted to provide a use solution. The diluent used to further dilute the liquid detergent concentrate is preferably a compatible diluent to that used in the liquid detergent concentrate. That is, if the liquid detergent concentrate was prepared with an aqueous diluent, the use solution is preferably prepared with an aqueous diluent.

In some applications, such as those requiring removal of clay soils or grease, the active ingredient level may need to be high to satisfactorily clean the vehicle. In one embodiment, the liquid detergent concentrate is diluted to provide an active ingredient concentration from about 0.01 wt. % to about 5 wt. % of the use solution, preferably from about 0.02 wt. % to about 2 wt. %, and more preferably from about 0.05 wt. % to about 1 wt. %. In another embodiment, the liquid detergent concentrate is diluted volumetrically, such as X volumes of diluent per volume of liquid detergent concentrate (X:1). Preferably, such dilutions are in the range from about 0.5:1 to about 100:1, more preferably from about 1:1 to about 50:1.

Preferably, the use solution is provided with a relatively constant detergent use solution concentration across the washing surface of a vehicle during a wash cycle. Typically, a relatively constant detergent use solution concentration has a relatively constant active ingredient concentration. However, a relatively constant detergent use solution concentration or a relatively constant active ingredient concentration can exist independent of one another. Preferably, the relative detergent use solution concentration and/or active ingredient concentration in the use solution is constant to within 20% during the majority of a wash cycle, more preferably to within 15%, even more preferably to within 10%, and even more preferably to within 9%.

The relative detergent use solution concentration and/or active ingredient concentration in the use solution can be measured indirectly by titrating samples of use solution to a predetermined endpoint. For example, samples may be taken at the beginning, middle and end of the wash cycle. However, the samples should not include the first few seconds or last few seconds of the wash cycle, as the concentration is in flux during solution change-overs. Titration samples of a majority of the wash cycle generally correspond to the front area of the washing surface (usually at about the front bumper), the middle area of the washing surface (usually at the windshield and/or roof), and the rear area of the washing surface (usually at the rear bumper). These samples may be taken directly from the washing system, such as a spray nozzel, at the appropriate period of the washing cycle.

The titration measures the acidity or alkalinity of the samples, which is directly correlated in a consistent ratio to active ingredient level. The titrant can be an acid of a known solution if titrating an alkaline solution to an acid endpoint, or the titrant can be a base of a known solution if titrating a acidic solution to a basic endpoint. Using titrating samples at the the beginning, middle and end of the wash cycle, the relative active ingredient concentration and/or detergent concentration when comparing the middle sample to the beginning sample and end sample, preferably titrates to the appropriate endpoint to within about 20% or less, more preferably within about 15% or less, even more preferably to within about 10% or less, and even more preferably to within about 9% or less. The titration results are generally in terms of volume, which may be reflected in drops.

Now referring to FIG. 1, depicting a car wash 100 for applying a detergent use solution to a motor vehicle 150. The vehicle 150 has a washing surface 160 that extends from the front of the vehicle 170 to the rear of the vehicle 180. The spray arm 600 receives detergent concentrate from a supply 120 through a chemical pump 150 and a chemical piping system 200 to a mixing valve 400. Water is supplied to the mixing valve 400 by pumping fresh water from a fresh water supply 300, through a water pump 250 and a water piping connection 350. The mixing valve 400 mixes the supplied liquid detergent concentrate from the chemical piping system 200 and fresh water from the water piping connection 350 to form a detergent use solution. The detergent use solution travels from the mixing valve 400 through use solution piping 500 to the spray arm 600. The spray arm 600 contains a frame 700 and a plurality of spray devices 750. The spray devices 750 apply detergent use solution to the washing surface 160 of the vehicle 150 in the car wash.

The car wash 100 depicted in FIG. 1 may be employed in an conveyor type of a bay automatic type vehicle washing system. In the conveyor setup, often referred to as a tunnel wash, the spray arm 600 is stationary and the vehicle to be washed is moved through the device either by a conveyor or by driving the car therethrough along a predetermined path. In the bay automatic setup, or rollerover type apparatus, the spray arm 600 is mounted on wheels for movement along a predetermined path wherein the rollover device is moved forwardly and backwardly over a stationary vehicle to wash the vehicle. In addition, both of the above-described types of vehicle washing devices may be employed in a brush or brushless mode wherein high pressure wash and rinse cycles are utilized so that cleaning components either touch or do not touch the vehicle respectively.

The detergent concentrate is mixed directly with fresh water in mixing valve 400 and supplied to the spray arm 600 through piping 500. The piping systems 120, 200, 300, 350, and 500 and mixing valve 400 may be designed in any manner with equipment that is capable of withstanding the water and/or chemical contact at high pressures over long periods of time. In particular, the mixing valve 400 is desirably a three-way automatic valve that allows adjustment of the position of the valve 400. Such an automatic valve is amenable to a control system wherein the conductivity of the detergent use solution supplied through piping system 500 can be monitored and controlled to a consistent active ingredient level. The three-way mixing valve 400 may then adjust the flow through the mixing valve 400 with corresponding increases or decreases in the flowrate of the liquid detergent concentrate supplied by the chemical pump 150 or the water pump 250.

The liquid detergent concentrate and fresh water may be supplied to the mixing valve 400 via pumps 150 and 250 operating under pressure. Detergent use solution is desirably applied to vehicles in commercial vehicle washing facilities under an application pressure between from about 50 psi to about 300 psi. Therefore, the chemical pump 150 and the water pump 250 may operate at any pressure to achieve the desired pressure range. In one embodiment, the water is supplied to the mixing valve 400 through the piping system 350 without using a water pump 250, and merely using the water pressure of the municipality supplied system. Typical water pressures supplied by a municipality are from about 15 psi to about 50 psi. Desirably, the detergent concentrate is supplied through a pump 150 at a pressure greater than that of the water supply thereby achieving a detergent use solution application pressure of from about 50 psi to about 300 psi.

Alternatively, the liquid detergent concentrate may be supplied to the mixing valve 400 using an aspirator. Such an aspirator allows the chemical pump 150 to operate at a lower pressure than the water supply pressure or the pressure supplied by the water pump 250. An aspirator is one preferred method as an injection device because a variety of pumps may be utilized that allow a larger volume of a more constant flow of detergent use solution into the water stream thereby avoiding pulsing effects of high pressure pumps. Car washing facility bays are generally exposed to ambient outdoor conditions.

Figure 2:
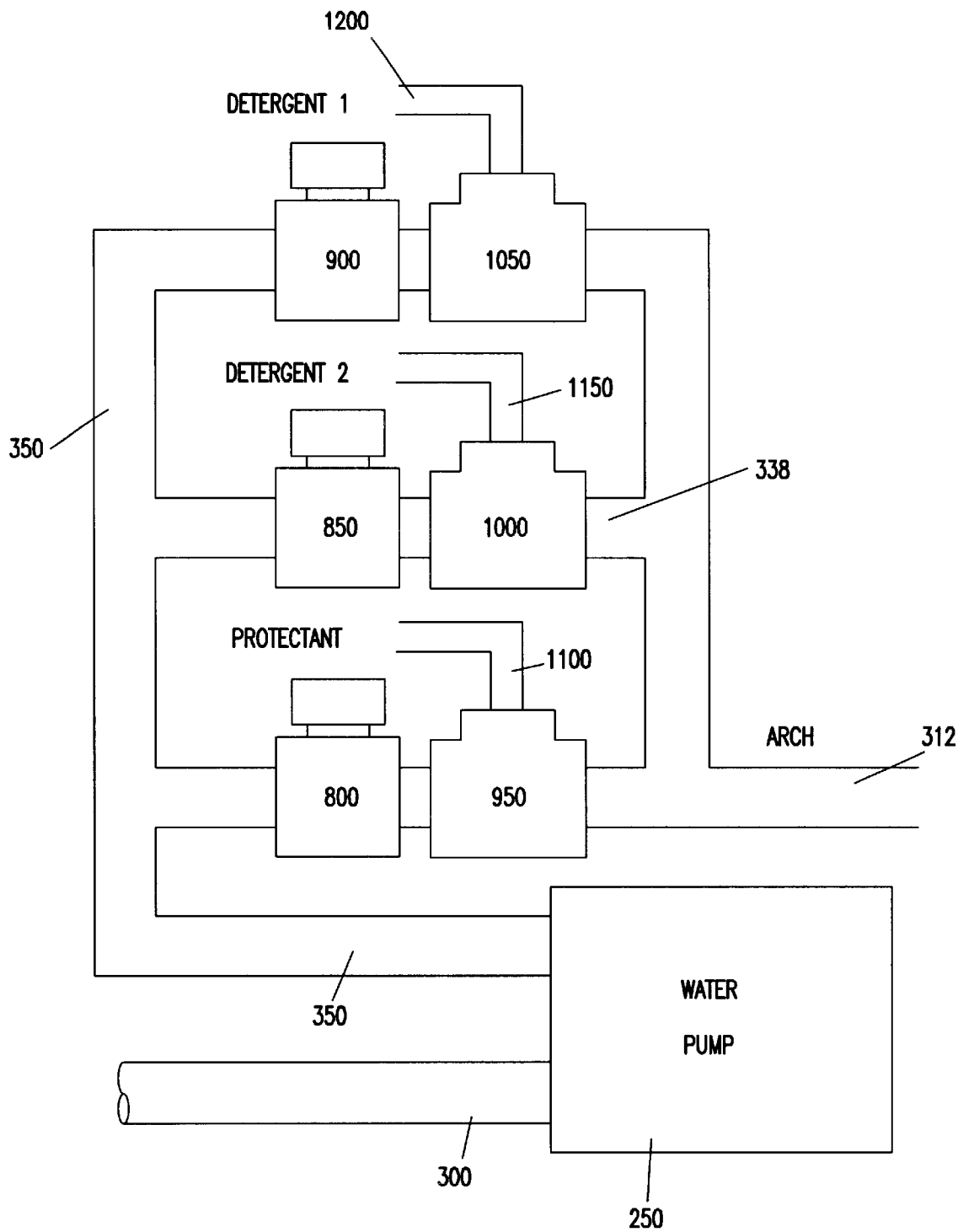
FIG. 2 is a schematic drawing of the apparatus from FIG. 1 using multiple chemicals.

FIG. 2 depicts the cleaning apparatus of FIG. 1 modified to allow for multiple chemicals. As with the water piping and pump in FIG. 1, in FIG. 2 water is supplied though supply piping 300 to water pump 250 and piping system 350. However, the mixing valve 400 from FIG. 1 is replaced with a valve manifold of mixing valves 950, 1000, and 1050 and flow control valves 800, 850, and 900, all of which are normally closed.

When a controller sends an electronic signal to start the wash cycle for detergent 1, valve 900 opens supplying water to mixing valve 1050 through piping 350. Detergent 1 is supplied from a pump through piping 1200 to mixing valve 1050 to create a detergent use solution 1 that travels through piping 500 to the spray arm arch 600 of FIG. 1. The controller sends an electronic signal to the valve 900 thereby closing the valve 900. This completes one wash cycle. Similarly, at the start of the wash cycle for detergent 2, the controller sends an electronic signal to valve 850. Valve 850 opens, supplying water to mixing valve 1000 through piping 350. Detergent 2 is supplied from a pump through piping 1150 to mixing valve 1000 to create detergent use solution 2 that travels through piping 500 to the spray arm arch 600. At the end of this wash cycle, the controller sends an electronic signal to the valve 850 thereby closing the valve 850. When the controller starts the wash cycle for protectant by sending an electronic signal to valve 800, the valve 800 opens, supplying water to mixing valve 950 through piping 350. The protectant is supplied from a pump through piping 1100 to mixing valve 950 to create detergent use solution of protectant that travels through piping 500 to the spray arm arch 600. At the end of the wash cycle, the controller sends an electronic signal to valve 800 thereby closing the valve 800.

Experimental:

The following examples are put forth so as to provide those of ordinary skill in the art with a complete disclosure and description of how the methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, percent is percent by weight given the component and the total weight of the composition, temperature is in ° F. or is at ambient temperature, and pressure is at or near atmospheric.

EXAMPLE 1

In this example, an alkaline detergent, 3600 CWX detergent (of standard concentration, approximately 45% active ingredients) was injected into a 90 psi water stream using an Ecovac System to create a detergent use solution. About 80 ml of the 3600 CWX detergent was utilized during the wash cycle. 5 ml samples were collected at the driver side and passenger side spray nozzels at the beginning of the wash cycle, when the nozzle was at the front area of the car near the front bumper; middle of the wash cycle, when the nozzle was at the windshield area and again at the center area of the car; and at the end of the wash cycle, when the nozzle was at the rear of the car near the rear bumper.

The samples were titrated by adding 3 drops of phenothalein to give a red/pink solution and adding drops of 0.1N HCl to obtain a clear solution. The enpoint had a pH of approximately 8.3. The drops of HCl required to reach the endpoint are shown in table 1.

TABLE 1

| Sample Location | Driver Side | Passenger Side |
| --- | --- | --- |
| Front of car | 8 drops | 32 drops |
| Windshield | 10 drops | not tested |
| Center of car | 11 drops | not tested |
| Rear of car | 37 drops | 48 drops |

EXAMPLE 2

Example 1 was repeated with 3600 CWX detergent injected into a water stream using an electric FASCO pump to create a detergent use solution. About 80 ml of the 3600 CWX detergent was utilized. 5 ml samples were taken at the beginning, middle and end of the wash cycle as in Example 1. The samples were then titrated using the same procedure described in Example 1 with the results as shown in table 2.

TABLE 2

| Sample Location | Driver Side | Passenger Side |
| --- | --- | --- |
| Front of car | 8 drops | not tested |
| Windshield | 10 drops | not tested |
| Center of car | 11 drops | not tested |
| Rear of car | 22–24 drops | not tested |

EXAMPLE 3

Example 1 was repeated with 3600 CWX detergent injected into a water stream using an electric FASCO pump to create a detergent use solution. The use solution entered 150 ml mixing bowls after the detergent concentrate injection point, but before application to the vehicle. About 80 ml of the 3600 CWX detergent was utilized. 5 ml samples were taken at the beginning and end of the wash cycle only. The samples were then titrated using the same procedure described in Example 1 with the results as shown in table 3.

TABLE 3

| Sample Location | Driver Side | Passenger Side |
| --- | --- | --- |
| Front of car | 8 drops | 8 drops |
| Rear of car | 22 drops | 22 drops |

EXAMPLE 4

In this example, a solid detergent was generated into a liquid detergent concentrate with approximately a 1.5% active ingredient level. During one car wash cycle, 800–1600 ml of the liquid detergent concentrate was utilized. 5 ml samples were taken at the beginning, middle and end of the wash cycle as in Example 1. The samples were then titrated using the same procedure described in Example 1 with the results as shown in table 4.

TABLE 4

| Sample Location | Driver Side | Passenger Side |
| --- | --- | --- |
| Front of car | 6 drops | 6 drops |
| Windshield | 5.5 drops | 5.5 drops |
| Rear of car | 5.5 drops | 5.5 drops |

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for washing a motor vehicle in an automatic vehicle washing facility, the method comprising:
   (a) degrading a solid detergent composition with water to provide a liquid detergent concentrate comprising an active ingredient level from about 0.1 wt. % to about 15 wt. %;
   (b) introducing the liquid detergent concentrate into a water stream to provide a detergent use solution comprising an active ingredient level from about 0.03 wt. % to about 1.0 wt. %; and
   (c) applying the use solution to a washing surface of a motor vehicle in the automatic vehicle washing facility, wherein samples taken from a front bumper, a windshield, and a rear bumper of the motor vehicle after a wash cycle exhibit a titration to an end point within about 20% or less.

2. A method according to claim 1, wherein the detergent use solution has an active ingredient level of between about 0.01 wt. % and about 5 wt. %.

3. A method according to claim 1, wherein the step of diluting the liquid detergent concentrate comprises diluting the liquid detergent concentrate with water at a volumetric ratio of the water to the liquid detergent concentrate of between about 0.5:1 and about 100:1.

4. A method according to claim 1, wherein the step of diluting the liquid detergent concentrate comprises diluting the liquid detergent concentrate with water at a volumetric ratio of the water to the liquid detergent concentrate of between about 1:1 and about 50:1.

5. A method according to claim 1, wherein the step of diluting the liquid detergent concentrate comprises pumping the liquid detergent concentrate into the water.

6. A method according to claim 1, wherein the step of diluting the liquid detergent concentrate comprises aspirating the liquid detergent concentrate into the water.

7. A method according to claim 1, wherein the step of applying the detergent use solution comprises applying the detergent use solution at a pressure of about 50 psi to about 300 psi.

8. A method according to claim 1, wherein the liquid detergent concentrate comprises an active ingredient level of about 1.1 wt. % to about 15 wt. %.

9. A method according to claim 1, wherein the liquid detergent concentrate comprises an active ingredient level of about 1.2 wt. % to about 10 wt. %.

10. A method according to claim 1, wherein the steps of mixing comprises providing the water stream at a pressure of between about 50 psi and about 300 psi via a water pump, and providing the liquid detergent concentrate containing an active ingredient level of between about 0.1 wt. % and about 15 wt. % at a pressure of about 50 psi to about 300 psi via a chemical pump.

11. A method according to claim 1, wherein the step of mixing comprises combining the detergent concentrate containing an active ingredient level of between about 0.1 wt. % and about 15 wt. % at a pressure of about 50 psi to about 300 psi with the water stream at a pressure of about 50 psi to about 300 psi in a mixing valve.

12. A method according to claim 1, wherein the step of mixing comprises aspirating the detergent concentrate containing an active ingredient level of between about 0.1 wt. % and about 15 wt. % into the water stream at a pressure of about 50 psi to about 300 psi.

13. A method according to claim 1, wherein samples taken from the front bumper, the windshield, and the rear bumper of the motor vehicle exhibit a titration within about 15% or less.

14. A method according to claim 1, wherein samples taken from the front bumper, the windshield, and the rear bumper of the motor vehicle exhibit a titration within about 10% or less.

15. A method according to claim 1, wherein samples taken from the front bumper, the windshield, and the rear bumper of the motor vehicle exhibit a titration within about 9% or less.

16. A method according to claim 1, wherein the step of applying the use solution to the washing surface of the motor vehicle in the automatic vehicle washing facility comprises applying the use solution through a spray arm in a conveyor type vehicle washing system.

17. A method according to claim 1, wherein the step of applying the use solution to the washing surface of the motor vehicle in the automatic vehicle washing facility comprises applying the use solution through a spray arm in a bay automatic type vehicle washing system where the spray arm passes over the motor vehicle while the motor vehicle is stationary.

18. A method for washing a motor vehicle in an automatic vehicle washing facility, the method comprising:
   (a) degrading a solid detergent composition with water to provide a liquid detergent concentrate comprising an active ingredient level from about 0.1 wt. % to about 15 wt. %;
   (b) introducing the liquid detergent concentrate into a water stream to provide a detergent use solution comprising an active ingredient level from about 0.03 wt. % to about 1.0 wt. %; and
   (c) applying the use solution to a washing surface of a motor vehicle in the automatic vehicle washing facility, wherein samples taken from a spray nozzle delivering the use solution at the beginning, middle, and end of a wash cycle, excluding the first few seconds and the last few seconds of the wash cycle, exhibit a titration within about 20% or less.

* * * * *